Dec. 1, 1942.  F. MÜLLNER  2,303,893
DYNAMO-ELECTRIC MACHINE
Filed Feb. 24, 1940
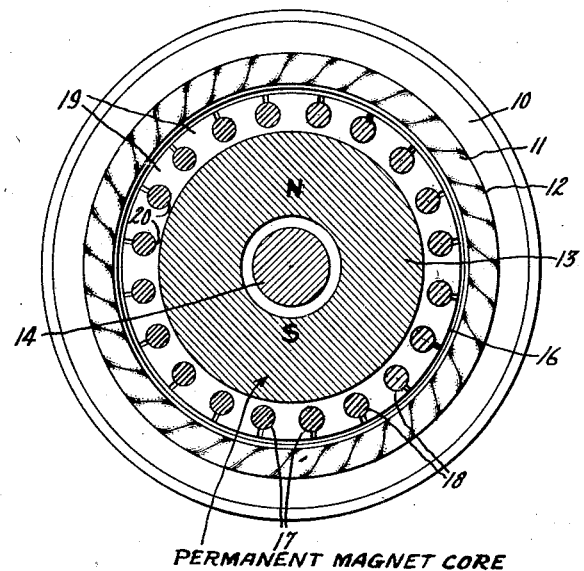
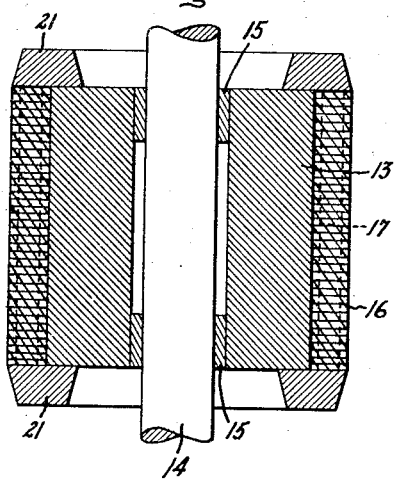 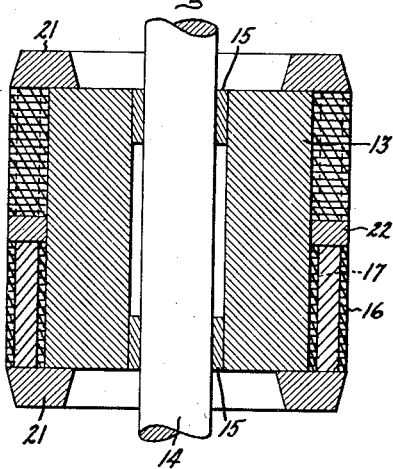
Inventor:
Friedrich Müllner,
by Harry C. Dunham
His Attorney.

Patented Dec. 1, 1942

2,303,893

UNITED STATES PATENT OFFICE 2,303,893

DYNAMO-ELECTRIC MACHINE

Friedrich Müllner, Berlin, Germany, assignor to General Electric Company, a corporation of New York Application February 24, 1940, Serial No. 320,642
In Germany April 26, 1939

4 Claims. (Cl. 172—120)

My invention relates to dynamo-electric machines, and more particularly to machines provided with a permanent magnet excitation system.

Heretofore, dynamo-electric machines of small and medium sizes have been excited by permanent magnets. In order to obtain a strong excitation system, permanent magnet steel alloys having additions of nickel, cobalt, and aluminum have been used. These alloys have a high coercive force but it has been found that they are difficult to machine and possess slight mechanical strength. Thus, since this type of magnet alloy is very brittle, there is a great possibility that it will fracture when it is subjected to considerable impact and vibration.

An object of my invention is to provide a dynamo-electric machine having a permanent magnet excitation system of the above-mentioned type which is simple, economical and durable.

I accomplish this by providing an improved reinforcing arrangement about the permanent magnet alloy.

Further objects and advantages of my invention will become apparent from the following description referring to the accompanying drawing, and the features of novelty which characterize my invention will be pointed out with particularity in the claims annexed to and forming a part of this specification.

In the drawing, Fig. 1 is a sectional end elevation of a dynamo-electric machine in partial section having a rotatable member provided with an embodiment of my improved excitation system; Fig. 2 is a sectional side elevation of the rotatable member illustrated in Fig. 1; and Fig. 3 is a sectional side elevation of a modification of the rotatable member illustrated in Fig. 2.

Referring to the drawing, in Fig. 1 I have illustrated a dynamo-electric machine including a stationary member provided with a laminated core 10 of magnetic material having a winding 11 arranged in slots 12 thereof. A rotatable member is arranged to provide the field excitation system for the dynamo-electric machine and includes permanent magnet pole pieces formed of a substantially cylindrical member 13 which is supported by a shaft 14. If the shaft is not made of a non-magnetic material, bushings 15 of non-magnetic material may be provided between the shaft and the permanent magnet body in order to preclude any harmful leakage of the flux transversely through the shaft.

When a rotor made of the above-mentioned magnet alloy is rotated at a high rate of speed and is subjected to considerable vibration, it has been found that there is a danger of fracture of the magnet material due to its normal brittleness. This danger of possible fracture is particularly prevalent when the dynamo-electric machine is placed in service upon aircraft which subjects the machine to considerable impact and vibration. It has been suggested to place massive pole pieces about the periphery of the magnet alloy. However, in such pole pieces great surface losses may be found which reduce the efficiency of the machine and cause additional heating. To overcome these difficulties, I arrange a laminated reinforcing sleeve 16 around the magnet material as shown in Figs. 2 and 3, having slots 17 disposed about the periphery thereof. The reinforcing sleeve member is made of material having a higher impact or tensile strength than the magnet material so that it will provide the desired reinforcement. These slots may be of circular shape, oval shape, or of any other suitable shape. The important feature, I have found, is to form the slots of such a shape as to obtain a low permeance near the outside of the slots in order to avoid any harmful peripheral leakage. Into the slots 17 I place suitable windings 18, such as squirrel cage windings. The slots 17 are spaced at a sufficient distance around the periphery of the sleeve member so that teeth 19 between the slots possess as great a cross section as possible so as to provide an arrangement for passing a maximum possible useful flux. The panels 20 underneath the squirrel cage winding which form the magnetic yoke of the rotor sleeve are so dimensioned that they have adequate mechanical strength, and moreover possess sufficient permeance for the residual flux. In the case of small machines, I have found that a thickness of the yoke of several millimeters is sufficient for this purpose.

It may be seen, therefore, that the squirrel cage winding suppresses the counter-running rotary field produced in the induced winding on the stationary member and also tends to increase further the mechanical strength of the reinforcing sleeve. Furthermore, the winding may act as a starting winding and also damp out oscillations of the rotor. In order to provide a short-circuiting arrangement for the squirrel cage winding, there are provided short-circuiting rings 21 at the ends of the sleeve member which abut against the ends of the squirrel cage winding conductors 18, as shown in Figs. 2 and 3, and these rings 21 are mechanically and electrically connected to the conductors 18 in any suitable manner, such as by the conventional way of casting conductors and end rings in an integral unit.

In cases where long rotatable members are used, I have found that it is desirable to place one or more intermediate ring members 22 around the pole pieces and intermediate the ends thereof in order to increase the mechanical strength of the excitation system. When these intermediate rings are provided, it is desirable to stagger the squirrel cage windings since by this arrangement the formation of harmonic waves is prevented in the retrograde rotary field.

Modifications of the particular arrangements which I have disclosed embodying my invention will occur to those skilled in the art, so that I do not desire my invention to be limited to the particular arrangement set forth and I intend in the appended claims to cover all modifications which do not depart from the spirit and scope of my invention.

What I claim as new and desire to secure by Letters Patent of the United States is:

1. A dynamo-electric machine having a core of magnetic material provided with a winding, a rotatable magnetic excitation system including permanent magnet pole pieces of relatively brittle material and a reinforcing sleeve member of magnetic material surrounding said pole pieces having slots, squirrel cage winding conductors in said slots, and means for short-circuiting said windings.

2. A dynamo-electric machine having a core of magnetic material provided with a winding, a rotatable magnetic excitation system including permanent magnet pole pieces of relatively brittle material and a laminated reinforcing sleeve member of magnetic material surrounding said pole pieces having slots, means including squirrel cage winding conductors in said slots for minimizing the demagnetizing effects on said permanent magnet pole pieces of current in said first-mentioned winding, and means for short-circuiting said winding conductors.

3. A dynamo-electric machine having a core of magnetic material provided with a winding, a rotatable magnetic excitation system including permanent magnet pole pieces of relatively brittle material and a laminated reinforcing sleeve member of magnetic material surrounding said pole pieces having slots, means including squirrel cage winding conductors in said slots for minimizing the demagnetizing effects on said permanent magnet pole pieces of current in said first-mentioned winding, and a ring member surrounding said pole pieces and intermediate the ends thereof in order to increase further the mechanical strength of said excitation system.

4. A dynamo-electric machine having a core of magnetic material provided with a winding, a rotatable magnetic excitation system including permanent magnetic pole pieces of relatively brittle material and a laminated reinforcing sleeve member of magnetic material surrounding said pole pieces having slots, a ring member surrounding said pole pieces and intermediate the ends thereof in order to increase further the mechanical strength of said excitation system, said slots on either side of said ring being staggered, windings in said slots, and means for short-circuiting said windings.

FRIEDRICH MÜLLNER.